I. M. JACOBS & W. CRAMER.
MECHANICAL MOVEMENT AND POWER TRANSFORMER.
APPLICATION FILED SEPT. 4, 1917.
1,273,613.
Patented July 23, 1918.
2 SHEETS—SHEET 1.
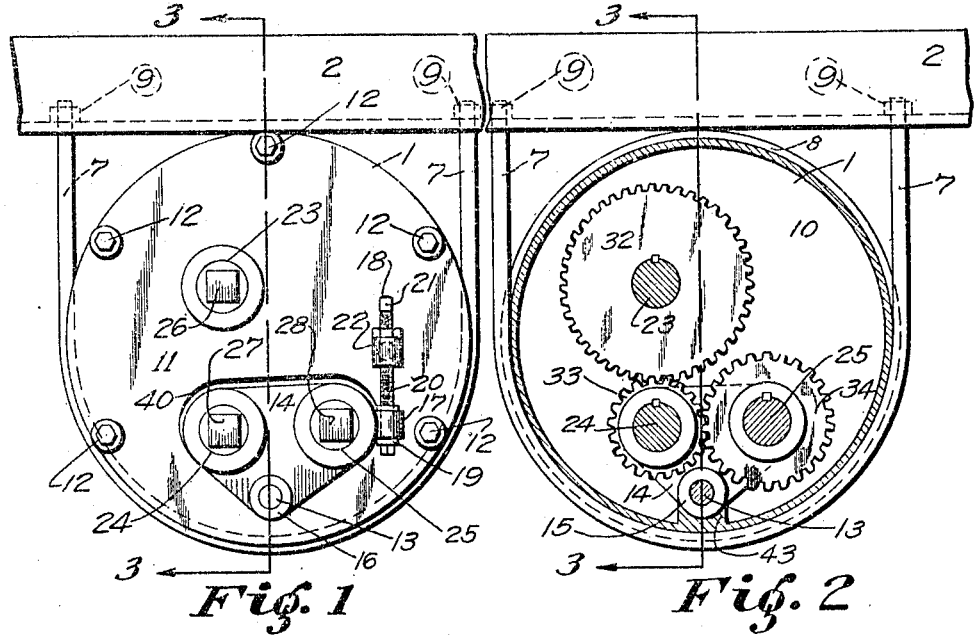
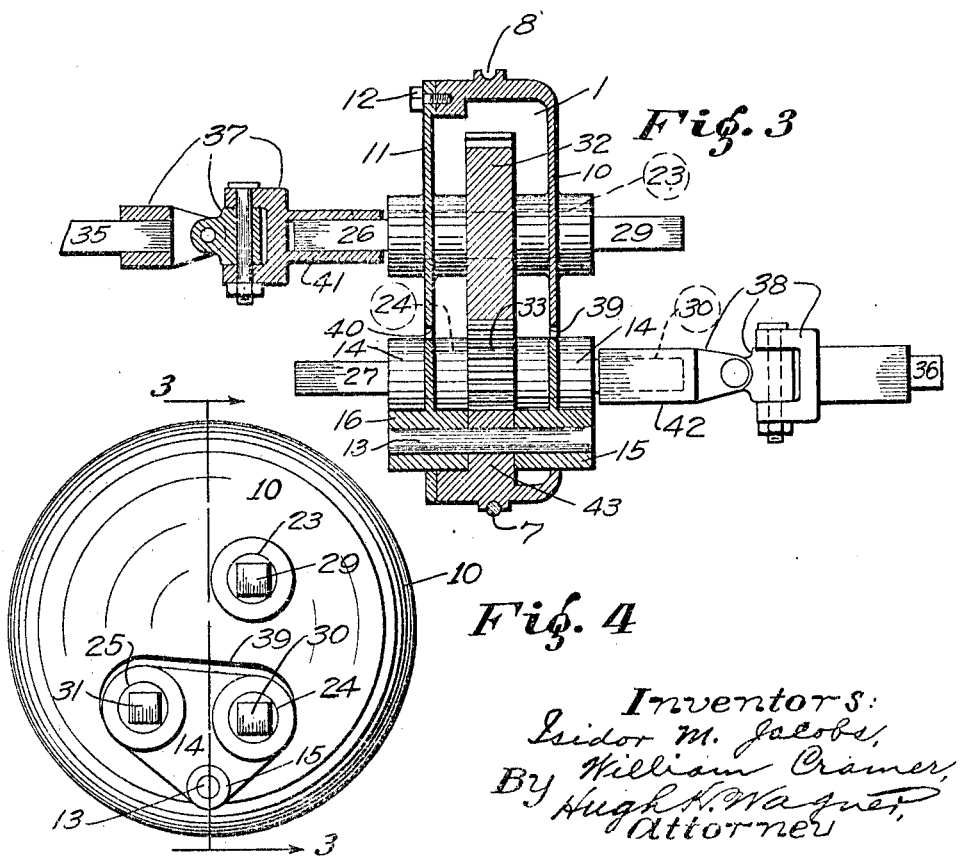

I. M. JACOBS & W. CRAMER.
MECHANICAL MOVEMENT AND POWER TRANSFORMER.
APPLICATION FILED SEPT. 4, 1917.
1,273,613.
Patented July 23, 1918.
2 SHEETS—SHEET 2.
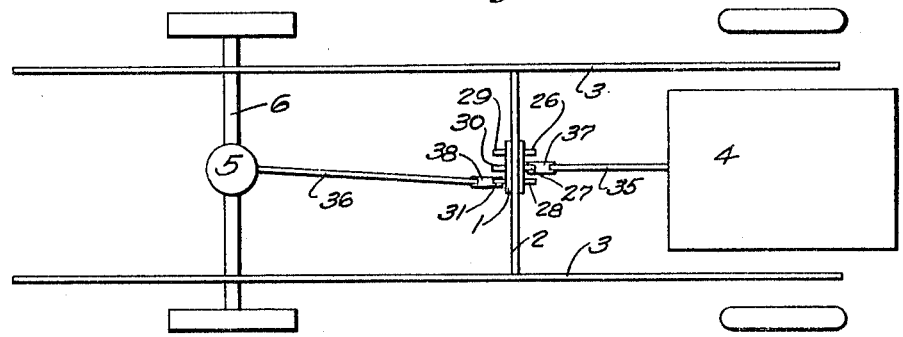
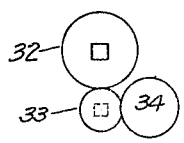 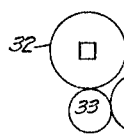 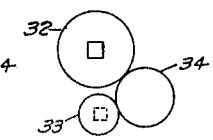 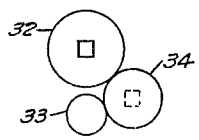 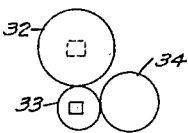
Fig. 6   Fig. 7   Fig. 8   Fig. 9   Fig. 10
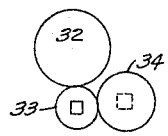 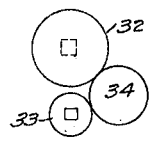 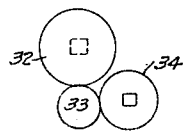 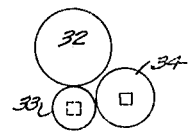 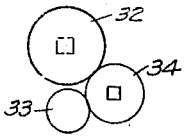
Fig. 11   Fig. 12   Fig. 13   Fig. 14   Fig. 15
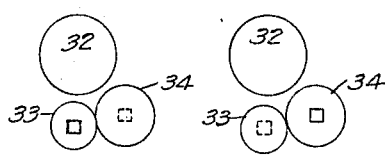
Fig. 16   Fig. 17
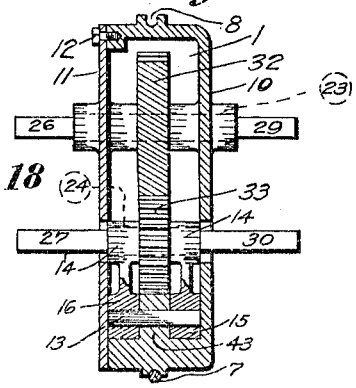
Inventors:
Isidor M. Jacobs,
William Cramer,
By Hugh K. Wagner,
Attorney.

UNITED STATES PATENT OFFICE.

ISIDOR M. JACOBS, OF KANSAS CITY, AND WILLIAM CRAMER, OF ST. LOUIS, MISSOURI, ASSIGNORS, BY MESNE ASSIGNMENTS, TO TRUCK, TRACTOR AND MANUFACTURING COMPANY, OF ST. LOUIS, MISSOURI, A CORPORATION OF MISSOURI.

MECHANICAL MOVEMENT AND POWER-TRANSFORMER.

1,273,613.      Specification of Letters Patent.      Patented July 23, 1918.

Application filed September 4, 1917. Serial No. 189,435.

*To all whom it may concern:*

Be it known that we, ISIDOR M. JACOBS and WILLIAM CRAMER, citizens of the United States, said ISIDOR M. JACOBS residing at the city of Kansas City, county of Jackson, and State of Missouri, and said WILLIAM CRAMER residing at the city of St. Louis, in the State of Missouri, have invented certain new and useful Improvements in Mechanical Movements and Power-Transformers, of which the following is a specification.

This invention is a mechanical movement and power transformer, and is herein shown and described as utilized in connection with the transmission of a motor-vehicle; but it will be found suitable for widely varied situations and various useful purposes. One of the subsidiary elements of the main device is in itself a mechanical movement, adapted for uses other than those herein shown and described in connection with the main device, as, for instance, as a speed-change gear-shift in a motor-vehicle.

In the accompanying drawings forming part of this specification and in which like numbers of reference denote like parts wherever they occur, Figure 1 is an elevation;

Fig. 2 is like Fig. 1, but with the face of the casing removed;

Fig. 3 is a section on the line 3—3 in Figs. 1, 2, and 4;

Fig. 4 is an elevation of the opposite side from that shown in Fig. 1;

Fig. 5 is a top plan diagrammatic view of a motor-vehicle such, for instance, as a truck;

Figs. 6 to 17, both inclusive, are diagrammatic views of a number of possible positions and combinations of the gears and shafts illustrated in Figs. 2 and 3; and Fig. 18 is a view resembling Fig. 3 and showing a modified form of rockable member.

The relative position and function of this device when used in a motor-vehicle is depicted in Fig. 5, in which the casing 1 is shown borne by the cross-piece 2 midway between the sides 3 of the chassis and, also, midway between the engine 4 and differential 5, mounted on the rear axle 6.

The casing 1 is preferably suspended from cross-piece 2 by U-strap 7, which in Figs. 1, 2, and 3 is seen seated in groove 8 and passing through holes in the channel or angle iron forming cross-piece 2, where it is held by nuts 9, which are adapted to draw on strap 7 and to bind casing 1 tightly to cross-piece 2.

Fig. 1 may be taken as representing a front elevation and Fig. 4 a rear elevation of the casing 1 and connected parts, and will be hereinafter so regarded, although as it is reversible (*mutatis mutandis*) this designation is more or less arbitrary.

Casing 1 is composed of a pair of members, one of which is a box 10 (preferably round in shape) and the other a lid 11, fastened by screws 12 to box 10.

A short shaft 13, serving as a pivot for rockable member 14, is fixed in the lugs 15 and 16 in the above-mentioned box and lid, respectively.

A hasp, ring, or hook 17 projecting from member 14 receives screw-member 18, having the head 19, screw-threads 20, and wrench-end 21, which screw-member 18 passes through the internally screw-threaded collar 22 fixed to lid 11. A partial turn with a wrench upon the end 21 (by reason of coöperation of the threads within collar 22 and the threads 20) rocks the member 14 on pivot or shaft 13, and the degree of movement of member 14 depends upon the degree of movement of screw 18, and the direction of the said movement depends upon the direction in which screw 18 is turned. The degree of movement of member 14 determines which of the gears borne or actuated thereby shall mesh with the other gear not carried thereon or actuated thereby.

A plurality of shafts 23, 24, and 25 pass through box 10 and lid 11, and each of the said shafts terminates in a polygonal projection 26, 27, and 28, respectively, at one of its ends and a polygonal projection 29, 30, and 31 at its other.

Gears 32, 33, and 34 are respectively fixed to shafts 23, 24, and 25. The variety of combinations depicted in Figs. 6 to 17 indicates that ordinary objects will be subserved by the three gears mounted on three shafts shown in the drawings herein. Figs. 16 and 17 show gears 33 and 34 in two neutral positions, in both which cases the engine 4 is connected directly to differential 5 through connecting-rods 35 and 36, universal joints 37 and 38, polygonal ends 26 and 29, and shaft 23. This arrangement will be used whenever the speed and direction of the engine 4 is suitable for the differential 5. If not, one of the other combinations or arrangements depicted in Figs. 6 to 15, both inclusive, will be selected and utilized. The appropriate one will, in the first instance, be empirically determined; but a record being kept of names or other identifying data the knowledge thus experimentally acquired can be instantly applied in subsequent cases. It will be observed that the arrangement of gears in Fig. 2 coincides with that in Fig. 6.

Shaft 23 is journaled in box 10 and lid 11, but shafts 24 and 25 pass through an opening in box 10 and an opening in lid 11 large enough for some rocking movement of member 14 and of the said shafts, and shafts 24 and 25 are journaled in rockable member 14 and carried thereby in its movement when rocked on pivot 13.

Member 14 extends through casing 1 and projects on both sides thereof, and is a solid and substantial and strong body, adapted to afford a firm support for shafts 24 and 25 and gears 33 and 34. In Figs. 1, 2, and 3, member 14 is shown protruding through openings 39 and 40 in box 10 and lid 11, respectively, and having space in the said openings for its movement up or down when rocked; but in Fig. 18 the said openings are closed, box 10 and lid 11 have solid walls, and member 14 is contained within casing 1.

Socket-pieces 41 and 42, respectively, contain angular sockets matching the polygonal ends 26, 27, 28, 29, 30, and 31, and, as shafts 35 and 36 are directly connected, respectively, to the engine 4 and differential 5, the said socket-pieces can not slip off the said polygonal ends, but must turn synchronously with the one to which each is connected. Disconnection of a socket-piece 41 or 42 from the polygonal end inserted in it must be begun by first disconnecting shaft 35 or shaft 36, respectively, at its opposite end, that is to say, from engine 4 or differential 5.

A pierced stud 43 projects from one side of box 10, affording a journal in line with the holes in lugs 15 and 16 for shaft 13.

When engine 4 and differential 5 fail in any respect to match, as, for instance, if the engine is designed to turn clockwise but the differential anti-clockwise, or if the engine is too speedy or too powerful or too slow or fails to develop sufficient power, such discrepancy can be rectified or such speed or power can be reduced or increased, according to need or desire, by so combining gears 32, 33, and 34 and their respective shafts in such manner as to obtain the desired result, which is done by inserting the socket 41 over the appropriate polygonal end 26, 27, or 28 or the socket 42 over the appropriate end 29, 30, or 31, thereby forming one of the combinations delineated in Figs. 6 to 17 for the transmission of power from engine 4 to differential 5. The device as thus used is a power transformer as well as transmitter.

More specifically stated, this invention is intended to afford opportunities for using the large and increasing number of second-hand engines and differentials and other parts of the motor power-plants of used pleasure motor-cars or the like in the construction of low-priced trucks and tractors and tractor-trucks. In essence, it is not necessary that the engines used shall be second-hand or that they shall have come from pleasure cars or be of that type; but the problem solved and the commercial and industrial end attained by this invention is that it affords an outlet or use for an immense number of second-hand internal combustion engines that are now for sale but without customers and for the additional engines of that kind that year after year will be introduced into the already glutted market. To a certain extent, this invention may be used in conjunction with the frames of cars or trucks already standard in certain sizes on the market, but this invention contemplates as a general practice the use of a standard truck or tractor frame specifically constructed and provided for the above-stated purposes, which standard frame will be of uniform dimensions and sizes suitable for trucks or the like.

As a general rule, it is not desired that trucks, tractor-trucks, and the like shall be capable of as great speed as pleasure cars, while they need more power, and this constitutes one of the reasons for the provision of the herein-described power transformer, although in practice the exigency has, also, arisen of driving a differential adapted to rotate in one direction by means of an engine adapted only to drive a differential adapted for the opposite rotation. This has been successfully accomplished by means of this power transformer.

Furthermore, the various combinations of gears and shafts shown in Figs. 6 to 17 make it possible to combine practically all known engines with all known differentials. While the combinations shown in Figs. 6 to 17 are believed to be practically complete, yet limitation thereto is not desired. With respect to the arrangements shown in Figs. 6 to 17, speed is affected only by the combinations shown in Figs. 6, 7, 10, 11, 12, 13, 14, and 15.

Moreover, by the use of this device, the number of revolutions of a high-speed engine will be cut down so as to fit such relatively slow speed of the differential as is suitable for trucks, tractors, and the like, with a consequent saving of gasolene. Thus, a Ford pleasure car is, without this device, geared four to one, while in a truck it should be geared seven to one, which change can be effected by the interposition of this power transformer.

Having thus described this invention, we hereby reserve the benefit of all changes in form, arrangement, order, or use of parts, as it is evident that many minor changes may be made therein without departing from the spirit of this invention or the scope of the following claims.

We claim:

1. A power-transformer comprising a central hollow member, a plurality of gears located therein, a plurality of shafts upon which the said gears are respectively mounted, each of the said shafts terminating at each of its ends in means for connection with an engaging member, and means for causing selective engagement of one or the other of the said gears with another.

2. A power-transformer comprising a central hollow member, a plurality of gears located therein, a plurality of shafts upon which the said gears are respectively mounted, each of the said shafts terminating at each of its ends in means for connection with an engaging member, and rockable means for causing selective engagement of one or the other of the said gears with another.

3. A motor-vehicle comprising a chassis, a cross-piece intermediate the engine and the differential connecting its side frames and adapted to support a power-transformer, the said power-transformer comprising a central hollow member, a plurality of gears located therein, and a plurality of shafts upon which the said gears are respectively mounted, each of the said shafts terminating at each of its ends in means for connection with an engaging member, and means for connecting the said power-transformer with the said engine and the said differential.

4. A motor-vehicle comprising a chassis, a cross-piece intermediate the engine and the differential connecting its side frames and adapted to support a power-transformer, the said power-transformer comprising a central hollow member, a plurality of gears located therein, a plurality of shafts upon which the said gears are respectively mounted, each of the said shafts terminating at each of its ends in means for connection with an engaging member, and means for causing selective engagement of one or the other of the said gears with another, and means for connecting the said power-transformer with the said engine and the said differential.

5. A motor-vehicle comprising a chassis, a cross-piece intermediate the engine and the differential connecting its side frames and adapted to support a power-transformer, the said power-transformer comprising a central hollow member, a plurality of gears located therein, a plurality of shafts upon which the said gears are respectively mounted, each of the said shafts terminating at each of its ends in means for connection with an engaging member, and rockable means for causing selective engagement of one or the other of the said gears with another, and means for connecting the said power-transformer with the said engine and the said differential.

6. A device of the character described comprising a support, a shaft-supporting member borne thereby, a movable gear-supporting element carried by the said last-mentioned member, a shaft journaled in the said shaft-supporting member, a gear fixed to the said shaft, gears journaled in connection with the said movable member, and means for moving the said movable member.

7. A device of the character described comprising a support, a shaft-supporting member borne thereby, a movable gear-supporting element carried by the said last-mentioned member, a shaft journaled in the said shaft-supporting member, a gear fixed to the said shaft, gears journaled in connection with the said movable member, means for moving the said movable member, and means for holding the same in fixed relation to the said first-mentioned gear.

8. A device of the character described comprising a support, a shaft-supporting member borne thereby, a movable gear-supporting element carried by the said last-mentioned member, a shaft journaled in the said shaft-supporting member, a gear fixed to the said shaft, gears journaled in connection with the said movable member, means for moving the said movable member, and means for holding the same in fixed relation to the said first-mentioned gear, the ends of each of the gear-shafts for the said gears having means for connection with adjoining parts.

9. A device of the character described comprising a support, a shaft-supporting member borne thereby, a movable gear-supporting element carried by the said last-mentioned member, a shaft journaled in the said shaft-supporting member, a gear fixed to the said shaft, gears journaled in connection with the said movable member, means for moving the said movable member, and means for holding the same in fixed relation to the said first-mentioned gear, the ends of each of the gear-shafts for the said gears having polygonal ends, and means for connection of the said device with adjoining mechanism, the said connecting means having a universal joint and a cup having a polygonal socket for attachment to one of the said polygonal ends.

10. A device of the character described comprising a support, a shaft-supporting member borne thereby, a movable gear-supporting element carried by the said last-mentioned member, a shaft journaled in the said shaft-supporting member, a gear fixed to the said shaft, gears journaled in connection with the said movable member, means for moving the said movable member, and means for holding the same in fixed relation to the said first-mentioned gear, the ends of each of the gear-shafts for the said gears having polygonal ends, and means for connection of the said device with adjoining mechanism, the said connecting means having a universal joint and a cup having a polygonal socket for attachment to one of the said polygonal ends, there being a plurality of the said connecting means.

11. A device of the character described comprising a support, a shaft-supporting member borne thereby, a movable gear-supporting element carried by the said last-mentioned member, a shaft journaled in the said shaft-supporting member, a gear fixed to the said shaft, gears journaled in connection with the said movable member, and means for moving the said movable member, the said means consisting of a member screw-threaded internally, a member screwthreaded externally and adapted to coöperate with the said internal screw threads, and means of attachment of the one to the other.

12. A device of the character described comprising a support, a shaft-supporting member borne thereby, a pivoted gear-supporting element carried by the said last-mentioned member, a shaft journaled in the said shaft-supporting member, a gear fixed to the said shaft, gears journaled in connection with the said pivoted member, and means for moving the said pivoted member.

13. A device of the character described comprising a support, a shaft-supporting member borne thereby, a pivoted gear-supporting element carried by the said last-mentioned member, a shaft journaled in the said shaft-supporting member, a gear fixed to the said shaft, gears journaled in connection with the said pivoted member, and means for moving the said pivoted member, there being a groove in the periphery of the said shaft-supporting member, and a strap fitting in the said groove and connected to the said support.

14. A device of the character described comprising a support, a shaft-supporting member borne thereby, a pivoted gear-supporting element carried by the said last-mentioned member, a shaft journaled in the said shaft-supporting member, a gear fixed to the said shaft, gears journaled in connection with the said pivoted member, and means for moving the said pivoted member, the said shaft-supporting member being composed of a pair of members forming a casing and having journals formed therein and having a journal-projection formed in one of them and located between the other said journals, a shaft running through the said three journals constituting the pivot for the said pivoted member.

15. A power-transformer, including a housing, a gear mounted therein, a shaft therefor, a plurality of differently-diametered gears, shafts therefor shiftably mounted in said housing, said differently-diametered gears being each engageable with the first-mentioned gear, the shafts of said gears being formed with means for connection with driving means, and driven means.

16. A power transformer, including a housing, a gear mounted therein, a shaft therefor, a plurality of differently-diametered gears, shafts therefor shiftably mounted in said housing, said differently-diametered gears being each engageable with the first-mentioned gear, said shafts being formed with angular extensions and socket-means of connection for said extensions adapted for the connection of said extensions with driving means, and driven means.

In testimony whereof we hereunto affix our signatures.

ISIDOR M. JACOBS.
WM. CRAMER.